US 8,874,856 B2

(12) United States Patent
Cho et al.

(10) Patent No.: US 8,874,856 B2
(45) Date of Patent: Oct. 28, 2014

(54) APPARATUS AND METHOD FOR DETECTING FALSE SHARING

(75) Inventors: Dae-Hyun Cho, Suwon-si (KR); Sung-Do Moon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 13/162,670

(22) Filed: Jun. 17, 2011

(65) Prior Publication Data

US 2012/0089785 A1 Apr. 12, 2012

(30) Foreign Application Priority Data

Oct. 8, 2010 (KR) .................. 10-2010-0098403

(51) Int. Cl.
*G06F 12/00* (2006.01)

(52) U.S. Cl.
USPC ............ 711/141; 711/E12.026; 711/E12.032; 711/E12.034; 711/E12.037; 711/E12.038; 711/E12.039

(58) Field of Classification Search
USPC ........... 711/141, E12.026, E12.032, E12.034, 711/E12.037, E12.038, E12.039
See application file for complete search history.

(56) References Cited

U.S. PATENT DOCUMENTS

| | | | |
|---|---|---|---|
| 5,710,881 A * | 1/1998 | Gupta et al. .................. 709/200 |
| 5,835,950 A * | 11/1998 | Cho et al. ...................... 711/144 |
| 6,094,709 A | 7/2000 | Baylor et al. | |
| 6,317,816 B1 * | 11/2001 | Loen .............................. 711/171 |
| 6,363,458 B1 * | 3/2002 | Park .............................. 711/141 |
| 6,457,107 B1 | 9/2002 | Wynn et al. | |
| 6,510,498 B1 * | 1/2003 | Holzle et al. ................... 711/153 |
| 6,591,355 B2 * | 7/2003 | Schuster et al. ............... 711/202 |
| 6,742,086 B1 * | 5/2004 | Cotugno et al. ............... 711/141 |
| 6,839,810 B2 * | 1/2005 | Takahashi ..................... 711/141 |
| 6,944,722 B2 | 9/2005 | Cantrill | |
| 6,963,953 B2 * | 11/2005 | Nakajima ..................... 711/129 |
| 7,093,081 B2 | 8/2006 | DeWitt, Jr. et al. | |
| 7,114,036 B2 | 9/2006 | DeWitt, Jr. et al. | |
| 7,243,194 B2 * | 7/2007 | Daly et al. ..................... 711/158 |
| 7,350,034 B2 * | 3/2008 | Shen ............................. 711/145 |

(Continued)

FOREIGN PATENT DOCUMENTS

JP 2000-267935 9/2000

OTHER PUBLICATIONS

Herb Sutter, "Eliminate False Sharing", May 14, 2009, pp. 1-6, http://www.drdobbs.com/parallel/eliminate-false-sharing/217500206.*

(Continued)

*Primary Examiner* — Edward Dudek, Jr.
*Assistant Examiner* — Christopher Birkhimer
(74) *Attorney, Agent, or Firm* — NSIP Law (57) ABSTRACT

A false sharing detecting apparatus for analyzing a multi-thread application, the false sharing detecting apparatus includes an operation set detecting unit configured to detect an operation set having a chance of causing performance degradation due to false sharing, and a probability calculation unit configured to calculate a first probability defined as a probability that the detected operation set is to be executed according to an execution pattern causing performance degradation due to false sharing, and calculate a second probability based on the calculated first probability. The second probability is defined as a probability that performance degradation due to false sharing occurs with respect to an operation included in the detected operation set.

20 Claims, 8 Drawing Sheets

(56) References Cited

U.S. PATENT DOCUMENTS

| | | |
|---|---|---|
| 7,496,908 B2 | 2/2009 | DeWitt, Jr. et al. |
| 2004/0205302 A1 | 10/2004 | Cantrill |
| 2005/0132144 A1 | 6/2005 | Illikkal et al. |
| 2007/0226723 A1 | 9/2007 | Eichenberger et al. |
| 2009/0125465 A1* | 5/2009 | Berg et al. .................. 706/17 |
| 2010/0088472 A1 | 4/2010 | Ukai |
| 2011/0307663 A1* | 12/2011 | Kultursay et al. ............ 711/125 |

OTHER PUBLICATIONS

Intel Corporation, "Avoiding and identifying False Sharing Among Threads", Feb. 24, 2010, http://web.archive.org/web/20100302073225/http://software.intel.com/en-us/articles/avoiding-and-identifying-false-sharing-among-threads/.*

European Search Report issued on Jan. 18, 2012 in corresponding Patent Application No. 1180902.6-1243 (8 pages).

"Improving Multi-Threaded Technology Based Processor Performance by Removing False Sharing and Enabling Global Store to Load Forwarding." ip.com Journal, Dec. 17, 2003, XP13013783 (3 pages).

* cited by examiner

APPARATUS AND METHOD FOR DETECTING FALSE SHARING

CROSS-REFERENCE TO RELATED APPLICATION

This application claims the benefit under 35 U.S.C. §119(a) of Korean Patent Application No. 10-2010-0098403, filed on Oct. 8, 2010, the disclosure of which is incorporated by reference in its entirety for all purposes.

BACKGROUND

1. Field

The following description relates to a technique for detecting false sharing.

2. Description of the Related Art

A symmetric multiprocessor (SMP) includes multiple CPUs or cores each having a local cache guaranteeing cache coherence of the local cache. False sharing is a phenomenon in which an identical data block is cached when threads performed on different CPUs access different memory addresses.

In addition, when a cache line loaded due to false sharing is updated by a thread of one CPU, a memory system of the SMP guaranteeing the cache coherence invalidates a cache line of another CPU which caches the same data block in cooperation with the one CPU. Accordingly, when a thread of the other CPU accesses the cache line of the other CPU again, a data block needs to be reloaded and newly cached and thus the system performance is degraded from the reloading of the data block.

Such false sharing needs to be avoided when developing a multi-thread application designed to run in a multi-core environment. According to an example of a method for detecting false sharing, a performance counter may be used to measure CPU performance. However, this method does not detect potential false sharing before false sharing occurs but instead detects the occurrence of false sharing that has happened by detecting a change in performance resulting from the false sharing. However, in order to detect false sharing during the development stage of multi-thread applications, identification of a chance of false sharing needs to be detected in advance during the development stage.

SUMMARY

In one general aspect, a false sharing detecting apparatus for analyzing a multi-thread application, the false sharing detecting apparatus including an operation set detecting unit and a probability calculation unit. The operation set detecting unit is configured to detect an operation set having a chance of causing performance degradation due to false sharing. The probability calculation unit is configured to calculate a first probability defined as a probability that the detected operation set is to be executed according to an execution pattern identified that may cause performance degradation due to false sharing, and to calculate a second probability based on the calculated first probability. The second probability is defined as a probability that performance degradation due to false sharing may occur with respect to an operation included in the detected operation set.

In another general aspect, a false sharing detecting method for analyzing a multi-thread application, the false sharing detecting method includes detecting an operation set having a chance of causing performance degradation due to false sharing is detected and calculating a first probability. The first probability is defined as a probability that the detected operation set is to be executed according to an execution pattern that may cause performance degradation due to false sharing. A second probability is calculated based on the calculated first probability. The second probability is defined as a probability that performance degradation occurs due to false sharing with respect to an operation included in the detected operation set.

Other features will become apparent to those skilled in the art from the following detailed description, which, taken in conjunction with the attached drawings, discloses examples of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, examples will be described with reference to accompanying drawings in detail.

Figure 1:
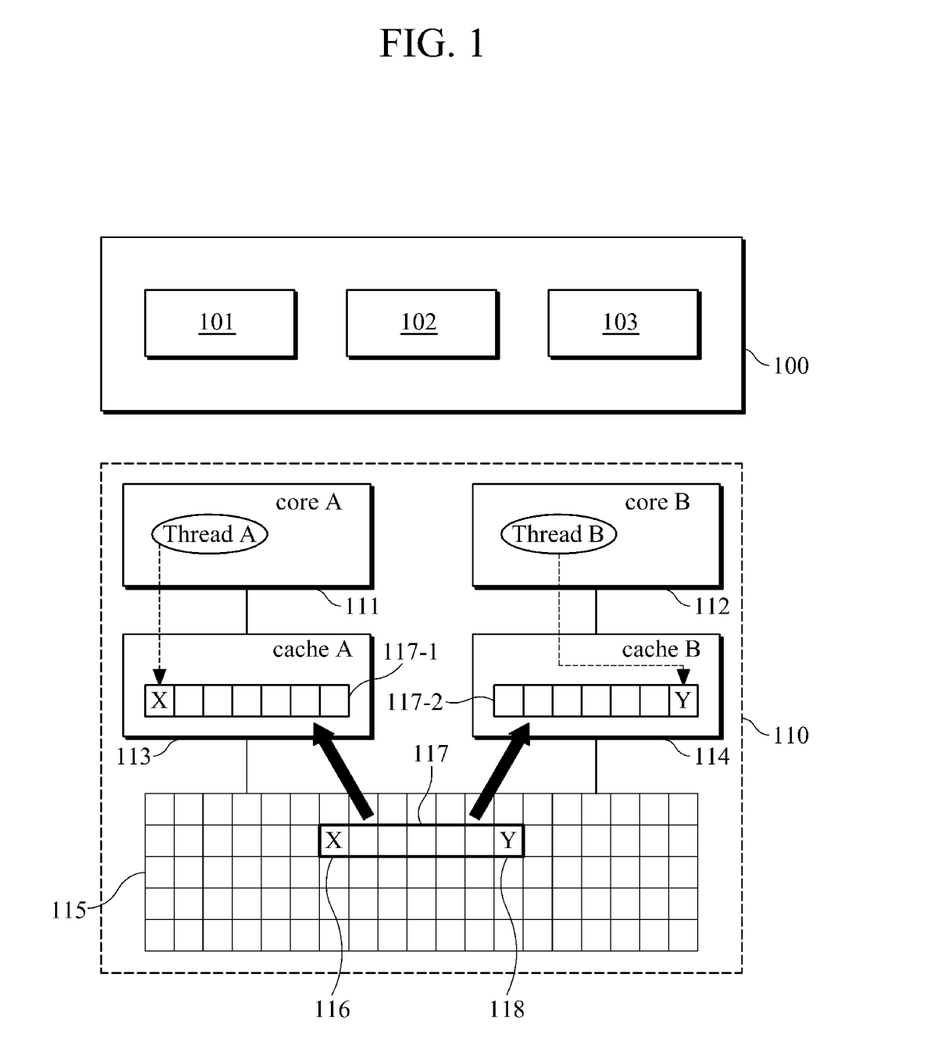
FIG. 1 shows an example of a false sharing detecting apparatus.

FIG. 1 shows an example of a false sharing detecting apparatus. The false sharing detecting apparatus 100 may be applied to a multi-core system 110 including a plurality of cores or central processing units (CPUs). The multi-core system 110 has a processing core A 111 and a processing core B 112 such that more than one thread of a multi-thread application is capable of being concurrently processed. The processing cores A and B 111 and 112 each may have a corresponding private cache, for example, the processing core A may have a cache A 113 and the processing core B may have a cache B 114, and each of the caches A and B 113 and 114 may be a local cache of each of the processing cores A and B 111 and 112, respectively.

In the multi-core system 110, when a thread A of the processing core A 111 accesses an object X 116 of a memory 115, a data block 117 including the object X 116 is loaded to the cache A 113. The data block 117 is stored in cache A 113 as a cache line 117-1. After the cache line 117-1 is loaded to the cache A 113, if a thread B of the processing core B 112 accesses an object Y 118 of the memory 115, the data block 117 including the object Y 118 of the memory 115 is loaded to the cache B 114. The data block 117 is stored in cache B 114 as a cache line 117-2. In this case, since the cache line 117-2 loaded to the cache B 114 is practically identical to the cache line 117-1 loaded to the cache A 113, when the thread B modifies the object Y of the cache line 117-2 loaded to the cache B 114, the cache line 117-1 of the cache A 113 may be invalidated to guarantee cache coherence. Accordingly, when the thread A of the processing core A 111 accesses the object X 116 again, or accesses a predetermined object residing on the same data block 117, a cache miss may occur and the cache line 117-1 may need to be reloaded.

The reloading of the cache line 117-1 causes performance degradation. However, the false sharing detecting apparatus 100 may calculate the probability of performance degradation caused by false sharing when a predetermined operation is executed, and notify a user of the probability of performance degradation due to false sharing. The false sharing detecting apparatus 100 includes an operation set detecting unit 101, a probability calculation unit 102 and a result reporting unit 103.

The operation set detecting unit 101 acquires memory access information, and happens-before and parallel relations of executable operations of, for example, a multi-thread application through a memory access and threading application programming interface (API) call trace.

The memory access trace may be implemented using an instrumentation function inserted into a source code or a binary code of, for example, a multi-thread application that is to be executed. The operation set detecting unit 101 detects operation sets having a probability of causing performance degradation due to false sharing by use of the acquired memory access information, and happens-before and parallel relations.

The detected operation sets may include an operation C representing a read or write operation of a first thread of, for example, a multi-thread application on a first memory object corresponding to a cache line L, an operation I representing a write operation of a second thread with a second memory object that shares the cache line L with the first memory object, and an operation R representing a read or write operation of the first thread that is executed after the operation C on a third object which corresponds to the cache line L and does not overlap with the second memory object.

The probability calculation unit 102 calculates a first probability defined as a probability that the detected operation set is executed according to an execution pattern that may cause performance degradation due to false sharing. For example, the first probability may be defined as a probability that an operation I is executed between an operation C and an operation R. If the operations C, I and R are executed in the order of operation C, then operation I and then operation R, the cache line L loaded at the operation C is invalidated due to the operation I and the cache line L is reloaded with execution of the operation R, so that performance degradation due to false sharing is caused. However, if the operations C, I and R are executed in the order of operation C, then operation R and then operation I, even if operation R is executed, the cache line L does not need to be reloaded, thereby preventing performance degradation due to false sharing. However, since the detected happens-before and parallel relations of operations are acquired through the memory access and thread API call trace, it is extremely difficult to know the order in which operations are to be executed when a source code or a binary code of, for example, a multi-thread application is executed in practice. Accordingly, the probability calculation unit 102 calculates the probability that operations are to be executed according to an execution pattern that may cause performance degradation due to false sharing by calculating the first probability for each detected operation set, that is, the probability that the operation I is to be executed between the operation C and the operation R.

In addition, the probability calculation unit 102 calculates a second probability based on the calculated first probability, in which the second probability is defined as a probability that performance degradation due to false sharing occurs with respect to an operation included in the detected operation set. For example, the second probability may be defined as a probability that a reload for a cache line L occurs when the operation R is executed.

Furthermore, when considered with respect to the operation R, a plurality of operations I causing a reload of the cache line L may be present. Each operation I has a first probability that each operation I is executed according to an execution pattern causing performance degradation due to false sharing. Accordingly, the probability calculation unit 102 may calculate the second probability by summing in probability the respective first probabilities of the operations I in the detected operation set.

The result report unit 103 provides a user with a portion of a source code or binary code of, for example, a multi-thread application likely to have performance degradation due to false sharing and the probability that performance degradation occurs within the portion due to false sharing. For example, the result report unit 103 may display codes associated with the operation R and the calculated second probability in an alignment according to the second probability.

Figure 2:
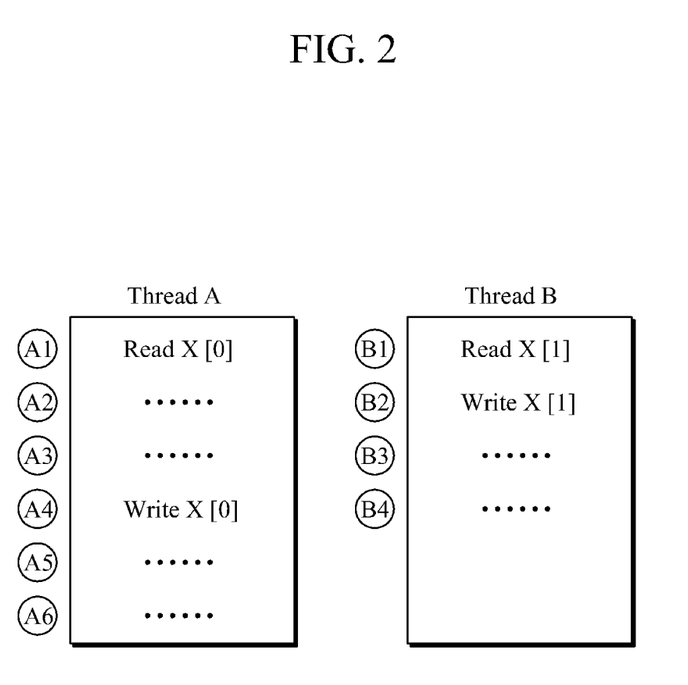
FIG. 2 shows an example of code blocks.

FIG. 2 shows an example of code blocks. As shown in FIGS. 1 and 2, thread A may be executed in the core A 111 and thread B may be executed in the core B 112. Each thread includes a plurality of operations. For example, the thread A may include six operations A1 to A6. Thread B may include four operations B1 to B4. X [0] and X [1] may represent memory objects. For example, operation A1 of the thread A may represent a read operation on X [0].

Assumed that X [0] and X [1] share the same cache line, and the execution order of the operations is A1→ ... →B1→ B2→ ... →A4. In this case, as the operation A1 is executed, a cache line including X [0] is loaded to the cache A 113. In addition, as the operation B1 is executed, a cache line including the X [1] is loaded to the cache B 114. Subsequently, if the operation B2 is executed, data is recorded to X [1] in the cache line loaded to the cache B 114 and the cache line loaded to the cache A 113 may be invalidated to guarantee cache coherence. Accordingly, when the operation A4 is executed, the cache line including the X [0] may be reloaded to the cache A 113, thereby causing performance degradation.

The operation set detecting unit 101 may detect operations having a chance of causing performance degradation due to false sharing in code blocks, for example, operations A1, B2 and A4, as shown in FIG. 2.

Figure 3:
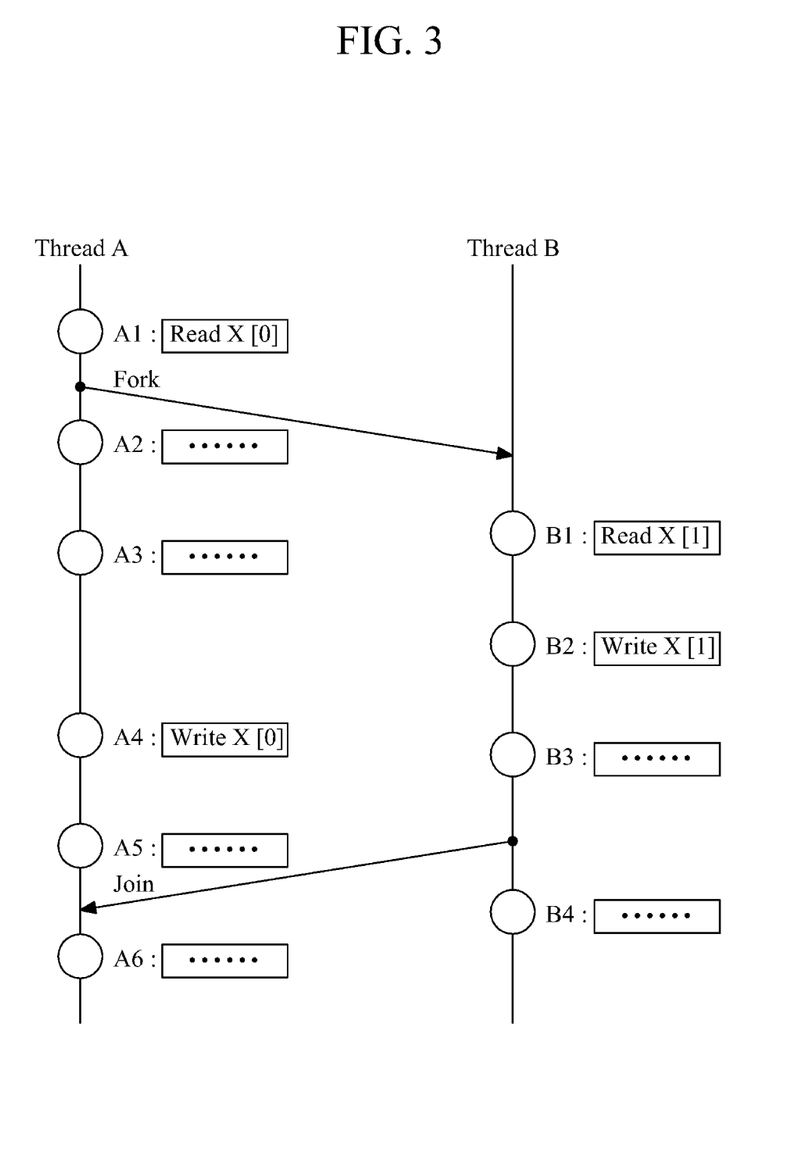
FIG. 3 shows an example of a memory access and threading API call trace.

FIG. 3 shows an example of a memory access and threading API call trace which resulted from inserting an instrumentation function for a memory access trace into code blocks of, for example, a multi-thread application and preliminarily executing the code blocks into which the instrumentation function is inserted.

As shown in FIG. 3, the access of each operation to the memory objects and happens-before and parallel relations of the respective operations are identified according to the memory access and threading API call trace. For example, the operation A1 of the thread A is an object accessing the memory object X [0]. The operation A1 of the thread A is in a happens-before relation with the operation B1 of the thread B, and the operations A2, A3, A4 and A5 of the thread A are in a parallel relation with the operations B1, B2 and B3 of the thread B. The happens-before/parallel relations between operations may be identified through a vector-clock that has a predetermined dimension and is exchanged between the thread A and the thread B at a threading API call.

The operation set detecting unit 101 may detect operations having a chance of causing performance degradation due to false sharing, by use of the memory access information and the happens-before/parallel relation of operations that are recognized through the memory access trace.

Figure 4:
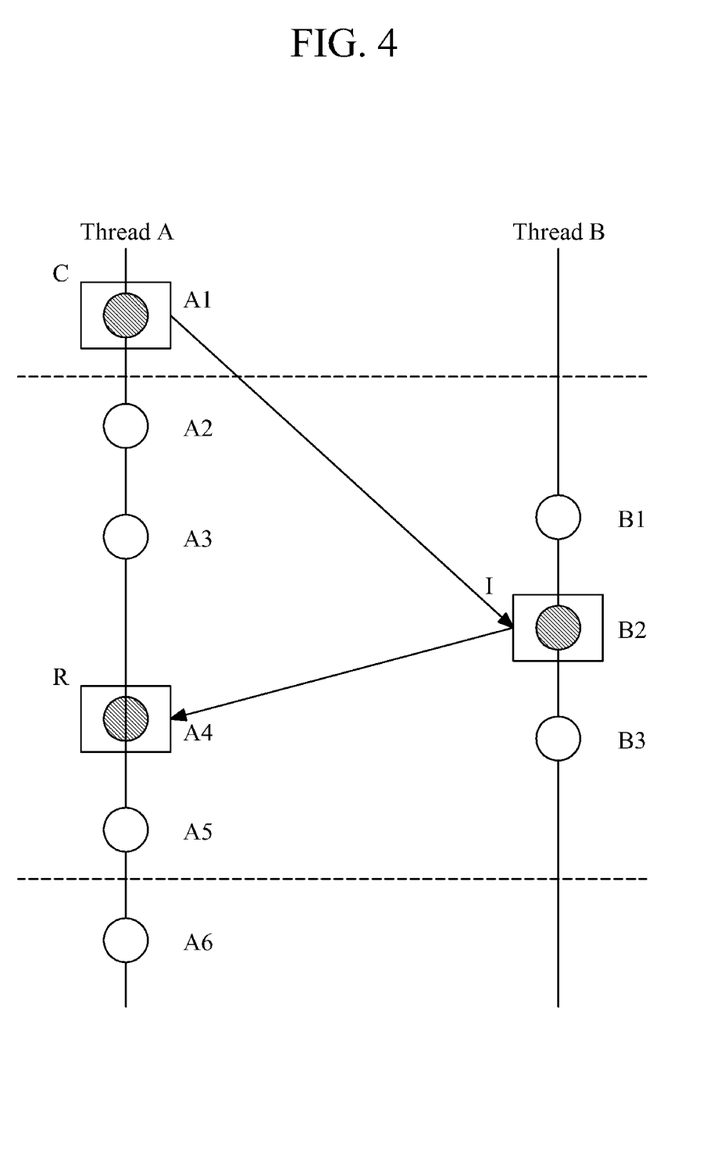
FIG. 4 shows an example of a set of detected operations.

FIG. 4 shows an example of a set of detected operations. As shown in FIGS. 1, 3, and 4, the operation set detecting unit 101 detects an operation set including the operation C, the operation I and the operation R.

The operation C represents a read operation or a write operation of the first thread on the first memory object corresponding to the cache line L. For example, the operation A1, which is a read operation on the memory object X [0] corresponding to the cache line L, may correspond with the operation C.

The operation I represents a write operation of the second thread on the second memory object sharing the cache line L with the first memory object. For example, the operation B2, which is a write operation on the memory object X [1] corresponding to the cache line L, may correspond with the operation I.

The operation R represents a read operation or a write operation of the first thread that is executed after the operation C on a third object which corresponds to the cache line L and does not overlap with the second memory object. For example, the operation A4, which is a write operation on the memory object X [0] corresponding to the cache line L, may correspond with the operation R.

Accordingly, a set of operations detected by the operation set detecting unit 101, for example, operations A1, B2 and A4 may be referred to as a "CIR set." For the sake of convenience, an example of one CIR set is shown in FIG. 4, but the number of CIR sets detected by the operation set detecting unit is not limited thereto. That is, as shown in FIG. 5, the operation set detecting unit 101 may detect a plurality of CIR sets satisfying a detection requirement in at least two threads.

Figure 5:
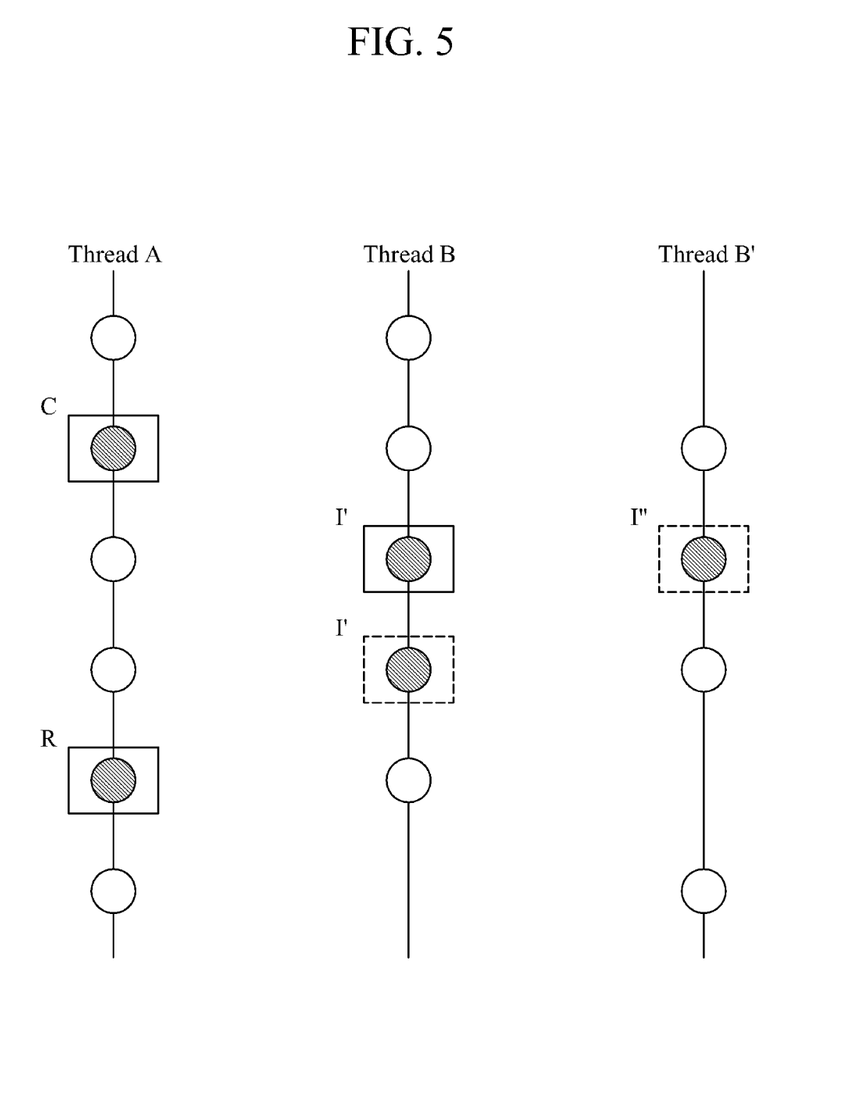
FIG. 5 shows another example of a set of detected operations.

FIG. 5 shows another example of a set of detected operations. As shown in FIG. 5, for example, the operation set detecting unit 101 may detect three CIR sets. Two CIR sets including C→I→R and C→I'→R are detected for the thread A and the thread B, and one CIR set C→I"→R is detected for the thread A and the thread B'.

As shown in FIGS. 4 and 5, if the operation set detecting unit 101 detects a plurality of CIR sets, the probability calculation unit 102 may calculate a first probability defined as a probability that each CIR set is to be executed according to an execution pattern causing performance degradation due to false sharing in practice. In addition, the probability calculation unit 102 calculates a second probability representing the severity of performance degradation due to false sharing, if the detected CIR set has a chance of being executed according to the execution pattern causing performance degradation due to false sharing.

Figure 6:
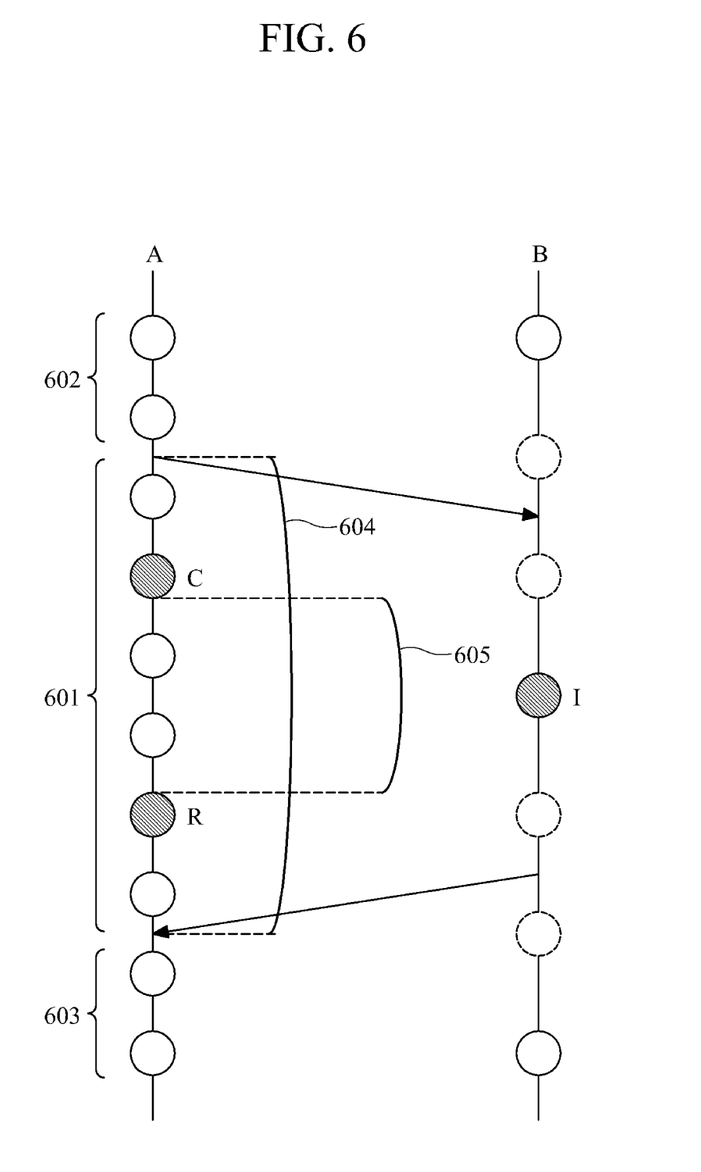
FIG. 6 shows an example of a method of obtaining a first probability.

FIG. 6 shows an example of a method of obtaining a first probability. With respect to the operation I of the thread B, the operations of the thread A are divided into a portion 601 having a parallel relation with the operation I, a portion 602 having a happens-before relation with the operation I and a portion 603 having a happens-after relation with the operation I.

The first probability is calculated as a probability that the operation I is executed between the operation C and the operation R. For example, the first probability is calculated based on the length and number 604 of operations having a parallel relation with the operation I among operations of the thread A, and the length and number 605 of operations having a parallel relation with the operation I among operations existing between the operation C and the operation R of the thread A. This is expressed by equation 1.

$$P(C \to I \to R) = \frac{\text{Length of operations between } C \text{ and } R, \text{ parallel to } I}{\text{Length of operations parallel to } I}, \quad [\text{Equation 1}]$$

(in Thread A)

According to equation 1, if each distance between operations is identical for a thread, the length of operations may be obtained by adding 1 to the number of operations when calculating the first probability.

Figure 7:
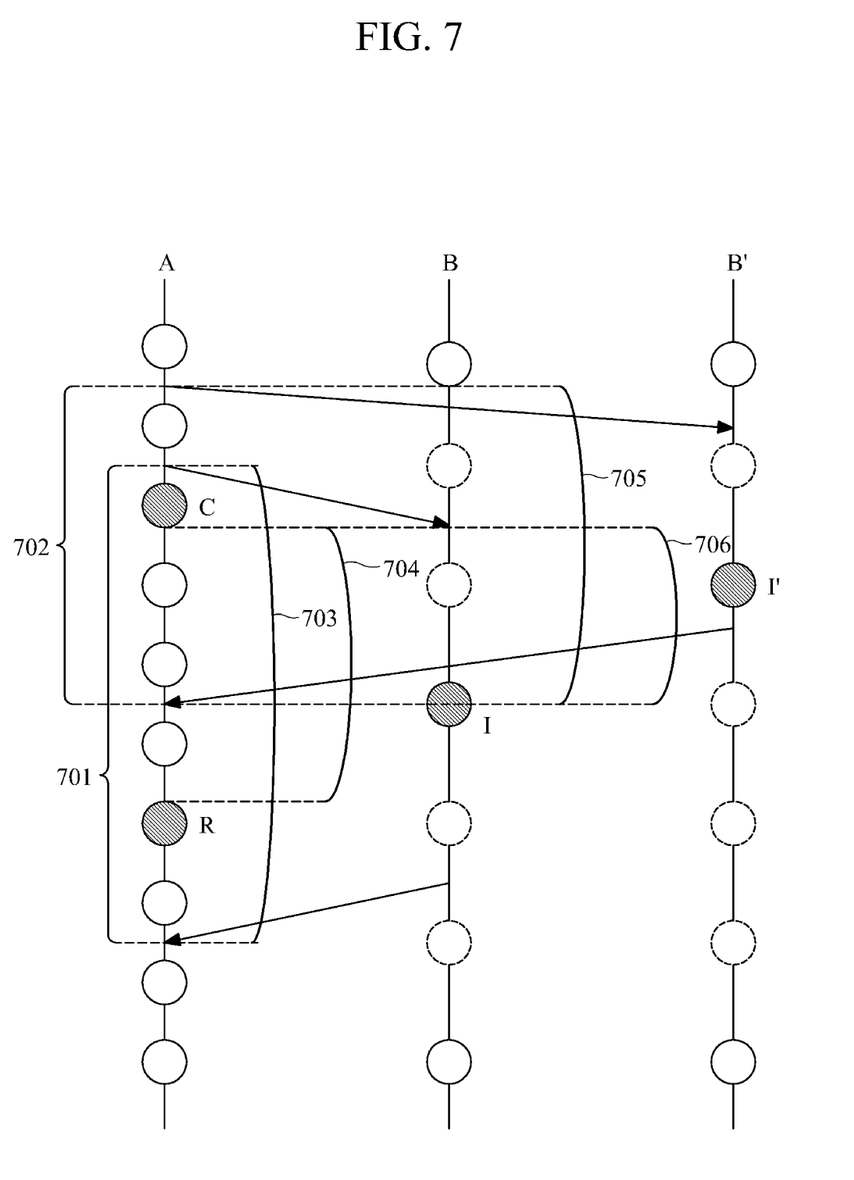
FIG. 7 shows an example of a method of obtaining a second probability.

FIG. 7 shows an example of a method of obtaining a second probability. As shown in FIG. 7, the second probability may be calculated as a probability that a reload with respect to a cache line occurs when the operation R is executed. For example, the second probability is obtained by summing in probability each first probability. The first probabilities are calculated for each detected respective CIR set.

When considered with respect to operation R, operation sets C→I→R and C→I'→R are detected as an example of the CIR sets. The first probability P (C→I→R) of the operation set C→I→R and the first probability P (C→I'→R) of the operation set C→I'→R are calculated as $4/7$ and $3/5$, respectively, through the above equation 1.

For the thread A and the thread B, the first probability P (C→I→R)=$4/7$ is calculated by use of the length 703 of operations 701 having a parallel relationship with the operation I among operations of the thread A and the length 704 of operations existing between the operation C and the operation R among the operations 701 of the thread A having a parallel relation with the operation I. For the thread A and the thread B', the first probability P (C→I'→R)=$3/5$ is calculated by use of the length 705 of operations 702 having a parallel relation with the operation I' among operations of the thread A and the length 706 of operations existing between the operation C and the operation R among the operations 702 of the thread A having a parallel relation with the operation F.

The second probability may be obtained by summing the calculated probabilities P (C→I→R) and P (C→I'→R) in probability. The summing in probability may not represent a simple summation of probabilities. That is, P (C→I→R) and P (C→I'→R) may not be obtained from independent events, and thus the probability at the operation R in consideration of all operations I (or operations I') may be obtained by subtracting the probability that all available operations I (or operations I') are not included between the operation C and the operation R from the total probability of 1. This is expressed by equation 2.

$$P(C \to \forall I \to R) = 1 - \prod_{\forall I} (1 - P(C \to I \to R)) \quad [\text{Equation 2}]$$

According to FIG. 7 and equation 2, the second probability may be calculated as $1-(1-(4/7))*(1-(3/5))$.

Figure 8:
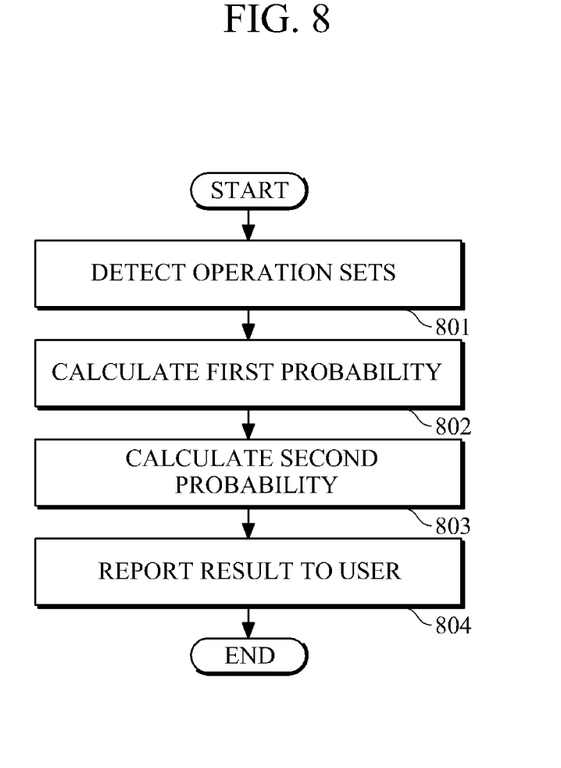
FIG. 8 shows an example of a false sharing detecting method.

FIG. 8 shows an example of a false sharing detecting method. Referring to FIG. 8 in conjunction with FIG. 1, a false sharing detecting method may be described as follows.

First, operation sets are detected (801). For example, the operation set detecting unit 101 may detect a plurality of CIR sets through a memory access trace, for example, as described in FIGS. 3 and 5.

Thereafter, the first probability is calculated (802). The first probability may represent the probability that each detected CIR set is executed according to an execution pattern causing performance degradation due to false sharing. For example, referring to FIG. 6 and equation 1, the probability calculation unit 102 may calculate the first probability based on the probability that the operation I is executed between the operation C and the operation R.

Then, the second probability is calculated (803). The second probability may represent the probability that performance degradation occurs due to false sharing with respect to the operation R of the CIR set. For example, referring to FIG. 7 and equation 2, the probability calculation unit 102 may calculate the second probability by summing first probabilities in probability.

The result may be reported to a user (804). For example, the result report unit 103 may indicate codes related to the operation R that may cause performance degradation due to false sharing in an alignment according to the calculated second probability.

As described above, according to the false sharing detecting apparatus and method, a portion having a chance of causing performance degradation due to false sharing may be detected during a preliminary execution through a memory access trace, and the severity of the performance degradation caused by the portion may be determined in terms of probability, so that potential performance degradation is preliminarily detected and modified.

The disclosure can also be embodied as computer readable codes on a computer readable recording medium. The computer readable recording medium is any data storage device that is capable of storing data which can be thereafter read by a computer system.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium may also be distributed over network coupled computer systems so that the computer readable code may be stored and executed in a distributed fashion Also, functional programs, codes, and code segments for accomplishing the present invention can be easily construed by programmers skilled in the art to which the present invention pertains. A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A false sharing detecting apparatus for analyzing a multi-thread application, the false sharing detecting apparatus comprising:
   a processor configured to detect an operation set having a chance of causing performance degradation due to false sharing, and
   to calculate a first probability defined as a probability that the detected operation set is to be executed according to an execution pattern causing performance degradation due to false sharing, and calculate a second probability based on the calculated first probability;
   wherein the second probability is defined as a probability that performance degradation due to false sharing occurs with respect to an operation included in the detected operation set.

2. The false sharing detecting apparatus of claim 1, wherein the processor detects an operation set including an operation C representing a read operation or a write operation of a first thread on a first memory object, an operation I representing a write operation of a second thread on a second memory object that shares a cache line with the first memory object, and an operation R representing a read operation or a write operation of the first thread that is executed after the operation C on a third object which corresponds to the cache line and does not overlap with the second memory object, and the first thread is separate from the second thread.

3. The false sharing detecting apparatus of claim 1, wherein the processor acquires memory access information of operations, and happens-before and parallel relations of operations based on an instrumentation function that is inserted in a source code or a binary code for a memory access and threading application programming interface (API) call trace.

4. The false sharing detecting apparatus of claim 2, wherein the processor calculates the first probability based on a probability that the operation I is executed between the operation C and the operation R.

5. The false sharing detecting apparatus of claim 4, wherein the processor calculates the first probability based on a length or a number of operations having a parallel relation with the operation I among operations of the first thread, and a length or a number of operations having a parallel relation with the operation I among operations existing between the operation C and the operation R of the first thread.

6. The false sharing detecting apparatus of claim 2, wherein the processor calculates the second probability based on a probability that a reload of the cache line occurs when the operation R is executed.

7. The false sharing detecting apparatus of claim 6, wherein the processor calculates the second probability by summing in probability each first probability calculated for each respective detected operation set.

8. The false sharing detecting apparatus of claim 2, wherein the processor is further configured to provide a user with codes associated with the operation R and the second probability.

9. The false sharing detecting apparatus of claim 8, wherein the processor displays the codes in an alignment according to the second probability.

10. A false sharing detecting method for analyzing a multi-thread application, the false sharing detecting method comprising:
    detecting an operation set having a chance of causing performance degradation due to false sharing;
    calculating a first probability that is defined as a probability that the detected operation set is to be executed according to an execution pattern causing performance degradation due to false sharing; and
    calculating a second probability based on the calculated first probability;
    wherein the second probability is defined as a probability that performance degradation due to false sharing occurs with respect to an operation included in the detected operation set, and wherein the detecting of the operation set, the calculating of the first probability, and the calculating of the second probability are performed by a processor.

11. The false sharing detecting method of claim 10, wherein, in the detecting of the operation set, the operation set includes an operation C representing a read operation or a write operation of a first thread on a first memory object, an operation I representing a write operation of a second thread on a second memory object that shares a cache line with the first memory object, and an operation R representing a read operation or a write operation of the first thread that is executed after the operation C on a third object which corresponds to the cache line and does not overlap with the second memory object, and the first thread is separate from the second thread.

12. The false sharing detecting method of claim 10, wherein, in the detecting of the operation set, memory access information of operations, and happens-before and parallel relations of operations are acquired based on an instrumentation function inserted in a source code or a binary code for a memory access and threading application programming interface (API) call trace.

13. The false sharing detecting method of claim 11, wherein, in the calculating of the first probability, the first probability is calculated based on a probability that the operation I is executed between the operation C and the operation R.

14. The false sharing detecting method of claim 13, wherein, in the calculating of the first probability, the first probability is calculated based on a length or a number of operations having a parallel relation with the operation I among operations of the first thread, and a length or a number of operations having a parallel relation with the operation I among operations existing between the operation C and the operation R of the first thread.

15. The false sharing detecting method of claim 11, wherein, in the calculating of the second probability, the second probability is calculated based on a probability that a reload of the cache line occurs when the operation R is executed.

16. The false sharing detecting method of claim 15, wherein, in the calculating of the second probability, the second probability is calculated by summing in probability each first probability calculated for each respective detected operation set.

17. The false sharing detecting method of claim 11, further comprising providing a user with codes associated with the operation R and the second probability.

18. The false sharing detecting method of claim 17, wherein, in the providing of the code associated with the operation R and the second probability, the codes are displayed in an alignment according to the second probability.

19. The false sharing detecting apparatus of claim 1, wherein the multi-thread application is executed on a symmetric multiprocessor.

20. The false sharing detecting method of claim 10, wherein the multi-thread application is executed on a symmetric multiprocessor.

* * * * *